July 8, 1924.

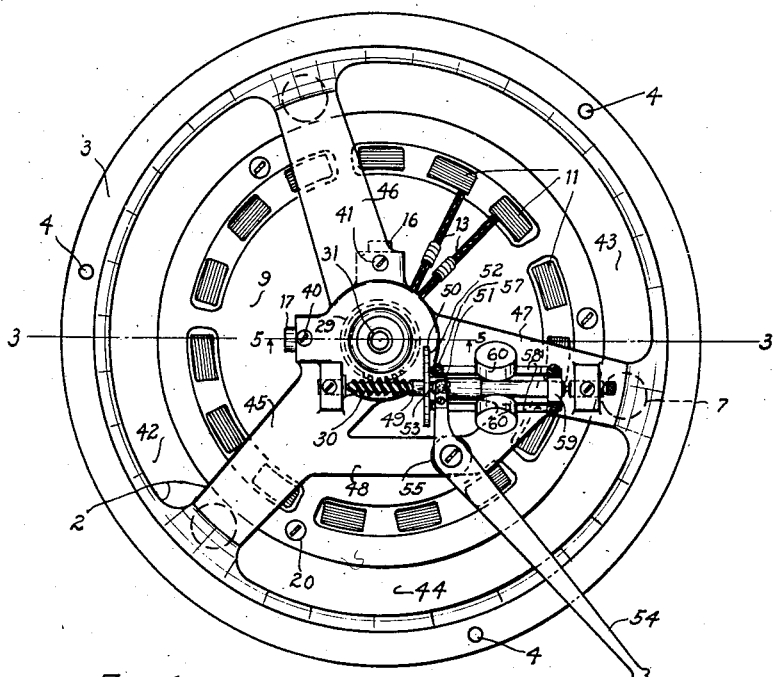

G. R. KUNKLE

SPEED REGULATED MOTOR

Filed Aug. 26, 1921

George R. Kunkle
INVENTOR.

BY Richey, Slough & Fales
HIS ATTORNEYS

Patented July 8, 1924.

1,500,826

UNITED STATES PATENT OFFICE.

GEORGE R. KUNKLE, OF ELYRIA, OHIO.

SPEED-REGULATED MOTOR.

Application filed August 26, 1921. Serial No. 495,756.

*To all whom it may concern:*

Be it known that I, GEORGE R. KUNKLE, a citizen of the United States, residing at Elyria, in the county of Lorain and State of Ohio, have invented certain new and useful Improvements in Speed-Regulated Motors; and I do hereby declare the following to be a full, clear, concise, and exact description of the invention, such as will enable those skilled in the art to which it appertains to make and use the same.

My invention relates to speed regulated motors, and particularly to motors of such size and kind as are adapted for such purposes as driving the turn-table of a phonograph at a uniform rate of speed.

It is an object of my invention to provide a motor of the type above referred to which will be capable of having its rotor directly connected to the turntable load, without the use of reducing gears, belts, pulleys or the like.

It is a further object of my invention to provide such a motor as will not be excessively slow in starting the rotation of the turntable, and which will soon cause the turntable to acquire its desired predetermined speed, and which when such speed is attained will not exceed such predetermined rotational speed.

Another object of my invention is to provide such a motor wherein the armature and field are both capable of rotation at the same time.

Another object of my invention is to accomplish the aforesaid objects in a structure which will be simple and relatively inexpensive to manufacture, and which will remain in proper operating adjustment for considerable periods of time, with little or no attention.

Other objects of my invention and the invention itself will be better understood from a description of the drawings accompanying this specification and forming a part thereof. In the drawings—

Fig. 1 is a top plan view of the electric motor of my invention, in which view a portion of the speed governing mechanism is shown.

Fig. 2 is a side elevational view, with a portion of the frame shown in vertical cross section, of my improved motor and speed controlling means therefor.

Figure 3:
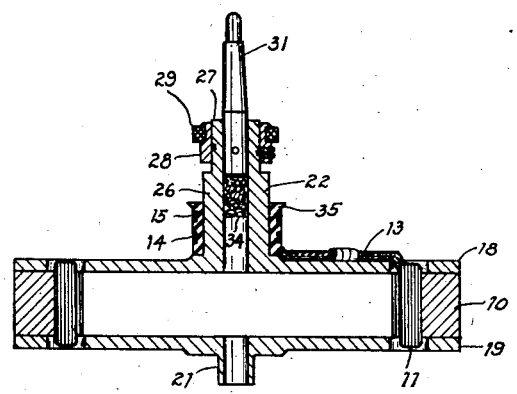
Fig. 3 is a vertical cross section of a portion of the motor structure exposing the field coils and current collector rings for leading current thereto, the section being taken on the line 3—3 of Fig. 1.
Figure 4:
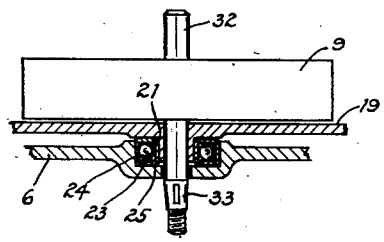
Fig. 4 is a vertical cross sectional view, taken on the line 5—5 of Fig. 1, of the bearings and a portion of the supporting frame and a portion of the frame of the field structure. The rotatable armature and armature shaft is herein shown in side elevation.
Figure 5:
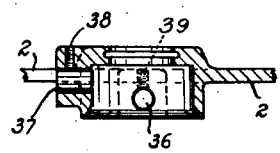
Fig. 5 is a cross sectional view, on the line 5—5 of Fig. 1, of that portion of the frame containing the brushes adapted to make connection with the collector rings shown in Figs. 2 and 3.

In the operation of automatic motors for particular purposes, such as for turning the turntable of a phonograph, it is very important that the phonograph turntable be rotated at a definite, predetermined speed and that the speed be maintained at a constant rate, even though the bearings friction, the load of the phonograph reproducer needle on the turntable supported record, or the power of the exciting electrical current supplied to the motor be variable.

Heretofore it has been proposed to accomplish the desired result of controlling the motor speed under the various conditions of use in a number of ways, among them being simply the use of an ordinary friction governor, such as is commonly employed in connection with phonograph spring motors, or the use of centrifugally operated electrical contacts placed in the electric circuit of a motor adapted to retard the motor speed by throttling the supplied current whenever a predetermined speed is exceeded.

The above and numerous other expedients proposed to take care of the regulation of speed for electric phonograph motors have been tried, but in practice have not met with unqualified success, in any case, for the following reasons: First, that where intermittently operated electric contacts are made, the contacts are in one of the motor circuits and interrupt an electric current, with a consequent sparking or arcing at the contacts to corrode the same. This corrosion varies the adjustment of the contacts, or the resistance of the circuit completed between them, or both, with consequent variation of the resultant motor speed. Second, where the ordinary centrifugally operated friction brake is employed to retard the speed of the motor, it is found that causes operative to create a tendency for the motor to rapidly increase in speed cannot be corrected by the friction governor operating alone, since the friction governor does not come into corrective operation until the accelerating cause has produced a considerable effect in increasing the speed of the motor, and that after the motor speed has been thus increased, the mass of the turntable and motor rotor and carried parts is so great as to produce a considerable inertia, which, unless the friction braking effect is made very powerful, will surge in the direction of increased speed before the friction brake can come into play to retard the speed, the result being a surging of rotational speed rate of the turntable above and below the predetermined speed; or, where the friction brake is less powerful, the motor will operate at a somewhat higher rate whenever speed increasing causes prevail for any length of time.

Various speed governing means heretofore proposed for the purpose above stated are of the one or the other type, or of some combination of each. In my present invention, therefore, I eliminate the necessity of employing circuit breaking contacts, which I have found to be more or less unreliable, and employ instead a particular kind of motor having both of its oppositely acting magnetic elements made rotatable, that is, both the armature and the field of the motor being capable of operating at the same time, but in opposite directions, the speed of rotation of either one depending upon the load that is applied on the other, there being a differential effect, so to speak, between the two rotating elements.

In connection with this description, I wish it to be understood that I do not limit my invention to any particular type of motor, and it may be of the alternating induction type, herein illustrated, or of the direct current commutator type, or a universal motor capable of operating with direct or alternating currents, it being understood that whereas in the present embodiment I employ slip rings and co-operating brushes, in order to convey current to the rotatable field, that I may likewise employ slip rings, or a commutator with brushes, to convey current to the rotating element, various kinds of motors being employed in the art at the present time, any of which, I believe, are capable of use in connection with my invention, providing that they are so modified that the two co-operating magnetic elements provided in all electric motors are capable of differential rotation, as above referred to. In connection, therefore, with my invention I will not describe specifically the small details of construction of the motor field and motor armature herein illustrated, it being understood that any well known form of motor field and motor armature adaptable for the purpose (of which there are many, to my knowledge), may be used.

Referring now to the drawings, illustrating a preferred embodiment of my invention, and in the different figures of which drawings like parts are designated by like reference characters, at 2 is shown a motor frame having an upper peripheral flange 3, the upper portion of the frame being substantially saucer-shaped, the motor being adapted to be hung within the frame of the phonograph by having its operating parts secured to the bottom of the saucer-shaped frame, the rim thereof being secured by a plurality of securing screws 4 to the said phonograph casing, a portion of which is shown in Fig. 2 at 5. In addition to that portion of the frame comprising the saucer-shaped member 2, a lower frame portion is provided, having an end plate 6 and connecting bars 7, the said connecting bars being preferably formed integrally with the frame 2 and depending therefrom, and being secured to the end member 6 by machine screws 8. The motor armature or inner rotatable magnetic element for the motor is indicated at 9 and the outer magnetic motor element, at 10, said outer element carrying field winding coils 11, the purpose of the said coils being to project magnetic flux from the field to the armature, in a well known manner.

The field coils 11 are connected by circuit conductors 13 to collector rings 14 and 15, said collector rings being adapted at all times to make contact with motor collector brushes 16 and 17, through which energizing current is supplied to the field coils 11 from an outside source of current. The field 10 has field end frame members 18 and 19, which clamp the intervening field laminations together by means of bolts 20. The field frame members 18 and 19 both have preferably integrally formed hub portions 21 and 22, the hub portion 21 supporting the field on bearings containing the bearing balls 23 and ball retaining races 24 and 25, the race 25 being tightly secured on the hub 21 and the race 24 being tightly secured within a concavity provided in the centrally disposed portion of the end frame member 6, the ball bearing being provided so as to minimize the frictional effects between the rotating field and the frame 6 in which the field is journalled.

The hub portion 22 of the field frame member 18 projects upwardly, having a slip ring supporting portion 26 and a portion 27 which, in the embodiment illustrated, is of smaller diameter, adapted to support a metallic hub 28 which carries a fiber gear 29. This gear is provided for the purpose of transmitting rotative motion from the motor field to the friction governor worm 30. Tightly secured within the hub member 22, near its upper end, is the phonograph record supporting stem 31, which is suitably tapered in order to permit the seating thereon of phonograph record turntables having a tapered opening through the center thereof. The armature is journalled within the field hub portions 21 and 22, having end shaft members 32 and 33. Located within the hub portion 22 above the end shaft member 32 for the armature is placed a cylindrical piece of oil-soaked felt 34, which is adapted to maintain the lubrication of the bearing surfaces of the shaft 32 and the inner surface of the hub 22.

The slip rings 14 and 15, usually constructed of copper or copper alloy, are embedded within peripheral slots on the hub 35, of insulating material, and which hub is tightly fitted over the portion 26 of the hub member 22. This insulating material may be hard rubber, fiber, bakelite, or other suitable material employed for like purposes.

The saucer-like portion of the motor frame 2 is provided at its central bottom portion with a preferably integrally formed brush holder frame, of generally inverted cup shape, having brush receiving openings 36 and 37, together with threaded openings 38 and 39, said threaded openings adapted to receive a set screw, such set screw being provided for the purpose of tightly securing the fiber bushing, which is adapted to be inserted through the openings 36 and 37, and through which fiber bushing a preferably graphitic brush is adapted to be inserted, in order to contact with the slip collector rings 14 and 15, which are connected to the field windings of the motor.

The brush-holding set screws 40 and 41 (Fig. 1) are adapted to co-operate with the threads of the threaded openings 38 and 39, so as to be capable of clamping the brushes 17 and 16, so as to hold them securely in place and with their inner ends in contact with the slip rings 15 and 14. When the motor is to be connected to an external source of electrical power, the incoming power circuit conductors will be connected directly to the brushes 16 and 17 in any suitable way, the circuit of the conductors being controlled by a switch of any approved form for applying or disconnecting the exciting current from the motor.

In order to lighten the motor assembly, that portion of the frame 2 is cut out at 42, 43 and 44, leaving that portion of the frame 2 in the form of three spoke-like pieces 45, 46 and 47, there being an integral bridge 48 between the spokes 45 and 47 for a purpose later to be made plain. Supported upon the end of the hub 22 at a portion 27 thereof is a metallic hub or collar 28 carrying the fiber pinion 29, as has been before referred to. This fiber pinion 29 is so threaded as to coact with the threads of the worm gear 30 which mesh therewith, and the shaft 49 which terminates at one end in the worm gear 30 is adapted to be rotated when the electric motor is operative to drive the phonograph turntable; that is, the shaft 49 will rotate at an increased speed under the propelling influence of the rotating field 10.

Although the gear ratio between the pinion 29 and the worm 30 may be made as desired, I prefer to use a ratio, for the purpose herein set forth, which will cause the worm shaft 49 to rotate about thirteen times faster than the pinion 29; that is, when the pinion 29 is rotating at the turntable speed of, say 80 R. P. M., the worm gear shaft 49 will be driven at a rate of substantially 1040 R. P. M.

Carried on the shaft 49 is a metallic friction disc 50, comprising a hub portion 51, the face 52 of the disc 50 being adapted to contact, when the motor is in operation, with a leather friction pad 53, which is carried on the end of an adjusting lever having a handle portion 54, the said lever being suitably journalled on a post 55. The post 55 supports the lever member which carries the friction pad 53 and the lever rotates thereon, being frictionally held against rotation by the contact made with the post and the securing screw 56 which clamps the lever to the post. By means of the handle 54 the positioning of the friction pad 53 may be adjusted so as to predetermine the speed at which the turntable will be rotated.

Secured to the hub portion 51 of the disc 50 by screws 57 is a plurality of flexible strips 58, which are secured at their other ends to a collar 59, which is rigidly secured to the shaft 49. Weight members 60 are carried on the flexible strips 58 at their mid points, the effect of the weights being that when the shaft 49 is rotated by centrifugal force, the weights 60 will fly outwardly, bowing the strips 58 and sliding the hubbed disc 50 towards the rigidly secured collar 59, and the friction surface 52 of the disc 50 is brought into contact, more or less, depending upon the speed, with the friction pad 53. This is the ordinary friction governor of the art, the effect of the pressure of the friction pad against the disc face 52 being to retard the speed of rotation of the turntable shaft and to maintain the speed of the turntable shaft substantially constant.

Both magnetic elements of the motor being rotatable, the rotation of the rotatable field to which the turntable shaft is connected causes an acceleration of the speed of rotation of the armature 9, whose speed is variably limited, principally by the opposition of the air to the rotating vanes 61 and 62, which are secured to the lower portion of the armature shaft 33 by a clamping nut 63. The clamping nut 63 holds a hub member 64 securely in place on the end of the shaft 33 and secured to the hub member 64 and extending therefrom is a plurality of vane-supporting rods 65. The vanes 61 and 62 are resiliently and rotatably carried by the rods 65, being maintained by the springs 66 in their normal, inoperative, perpendicular position. One end of each of the springs 66 engages the lower portion of the vane at 67, the spring then encircling in a spiral its supporting rod 65, the other end of the spring being secured rigidly to the supporting rod 65 by means of tension adjusting collars 68, to which the end of the spring is rigidly secured.

The collars 68 are adapted to be rotatably moved on the shaft 65 and rigidly set in an adjusted position by means of the set screws 69, so that the tension of the spring 66 may be increased or decreased, as may be desired. The vanes 61 and 62, when the motor is started, being in their normal, perpendicular positions, will engage the air in their path, the air acting to retard the rotation of the armature 9 which propel the vanes, and in starting, this effect is sufficiently great, that due to the differential effect of the two magnetic motor elements, the field element 10 will be rotated at an increased rate of speed; this, because retarding the one element of the pair also causes an increase in speed of the other element, or a tendency towards such increase. As the motor comes into full speed operation by the action of the friction governor operating upon the turntable stem or shaft 31, and the vanes 61 and 62 retarding the speed of rotation of the magnetic element 9 through the shaft 33, to which they are secured, a balance will be had whereby both field and armature will rotate at different speeds, depending upon the relative resistance to the rotation of each, this resistance comprising, in the case of the field, the turntable and reproducer needle load, as well as the friction between the moving parts, in addition to the frictional effect produced upon the governor disc 50 by the leather friction pad 53 under the control of the centrifugally operated weights 60. The armature will be likewise retarded by friction effects in the bearings, and in addition, the variably operable effects upon the vanes 61 and 62 by the air in their path.

The vanes 61 and 62, of which any desired number may be provided, and which may be immersed in any other fluid besides air, such as oil or other fluid, are resiliently held by the springs 66 in their normally vertical position by stops 100, but when at high speeds the pressure of the fluid, such as air, becomes great enough, the springs 66 will yield and the vanes will rotate about their supporting shafts 65 to take an inclined position, the arrangement being such that the inclination of the vanes 61 will increase towards the horizontal position as the propelling speed of the armature increases. This arrangement provides for less opposition to the armature speed as the armature speed increases. By such an arrangement in combination with the friction governor acting upon the field magnetic motor element, a quick starting of the turntable may be had and a nice balance maintained between the rotating field carrying the turntable and the rotating armature carrying the vanes. When so operating with such a balance, the friction governor maintains the turntable speed at a given maximum speed, the excess energy which would otherwise cause it to rotate at a higher rate of speed causing an increase in speed of the armature carrying the vanes.

Having thus described my invention in a specific embodiment, I wish it to be understood that other numerous and extensive departures may be made from the specific embodiment herein illustrated and described for the purpose of explaining my invention, but without departing from the spirit thereof, the scope of my invention being defined only by the scope of the appended claims.

I claim:

1. In a device of the class described, a dynamo-electric machine comprising a pair of rotors, a winding on one of the said rotors adapted to be connected to an outside source of power to energize the dynamo-electric machine, both of said rotors being independently rotatable in opposite directions, a governor driven by one of the rotors, a phonograph turntable directly connected to the said rotor, said governor being driven by the said rotor at a higher rate of speed, and speed controlling means associated with the other rotor, said governor and said speed controlling means being adapted to maintain the speed of the first rotor at a predetermined substantially constant speed.

2. In a phonograph motor, a pair of rotor elements therefor, both said elements being independently rotatable in opposite directions, an electrical winding on one of the said rotors adapted to be connected to an outside source of electrical current to energize the same, a phonograph turn-table directly connected to the other said rotor and rotatable thereby, and a speed governor driven by such rotor to prevent its speed from exceeding a predetermined speed, and a magnetic circuit energized by the said winding comprising both said rotors.

In witness whereof, I have hereunto signed my name this 16th day of August, 1921.

GEORGE R. KUNKLE.